Feb. 16, 1965 R. A. KAENEL 3,170,069

FREQUENCY-DIVIDING CIRCUIT

Filed Dec. 16, 1960 2 Sheets-Sheet 1

INVENTOR
R. A. KAENEL
BY Lucian E. Canepa
ATTORNEY

Feb. 16, 1965 R. A. KAENEL 3,170,069

FREQUENCY-DIVIDING CIRCUIT

Filed Dec. 16, 1960 2 Sheets-Sheet 2

INVENTOR
R. A. KAENEL
BY Lucian C. Canepa
ATTORNEY

United States Patent Office 3,170,069

Patented Feb. 16, 1965

3,170,069

FREQUENCY-DIVIDING CIRCUIT

Reginald A. Kaenel, Murray Hill, N.J., assignor to Bell Telephone Laboratories, Incorporated, New York, N.Y., a corporation of New York Filed Dec. 16, 1960, Ser. No. 76,378
2 Claims. (Cl. 307—88)

Figure 1:
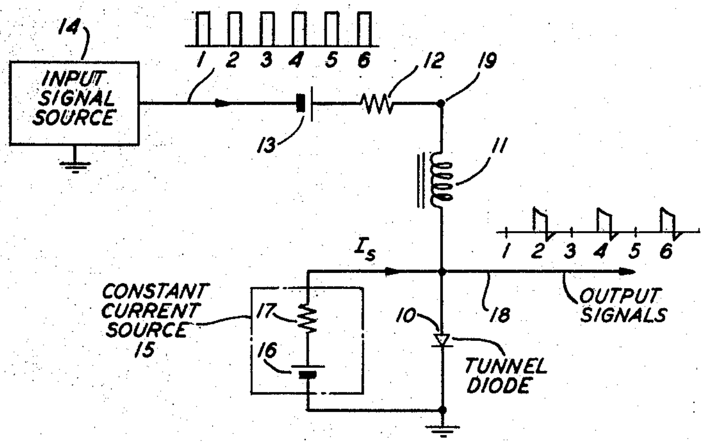

This invention relates to signal translating circuits, and more particularly to frequency-dividing circuits.

Frequency-dividing circuits, i.e., circuits which provide a single output signal in response to the application thereto of a predetermined number of input signals, are widely used in the information processing art, for example, in computing systems. As the complexity and speed of operation of such systems has increased, it has become increasingly important that the component circuits thereof, such as frequency-dividing circuits, be characterized by reliability, simplicity, and high speed performance.

An object of the present invention is the improvement of signal translating circuits.

More specifically, an object of this invention is the provision of frequency-dividing circuits which are characterized by high reliability, simplicity of design, high speed, and low power dissipation.

These and other objects of the present invention are realized in a specific illustrative embodiment thereof which includes a negative resistance diode of the voltage-controlled type connected in series with an inductor having a core that exhibits a rectangular hysteresis loop characteristic. A constant current source is connected in parallel with the diode and the diode is biased at a point on the relatively low voltage positive resistance region of its characteristic curve for monostable operation. Sets of input signals are applied to the diode-inductor series arrangement, each signal stepping the core of the inductor toward its maximum positive remanent flux state, only the last or $n$th signal of each set being effective, however, to actually shift the core to that state. As a result, the $n$th signal of each set triggers the diode to undergo a regenerative switching cycle, which, in turn, causes an output signal to appear across the diode. Thus, the embodiment responds to the application thereto of each set of $n$ input signals to provide a single output signal.

During each regenerative switching cycle, current from the constant current source is directed through the inductor in a reverse flux direction, thereby resetting the core to its initial or maximum negative remanent flux state and readying the circuit for another cycle of operation.

It is a feature of the present invention that a frequency-dividing circuit include a negative resistance diode connected in series with an inductor which has a rectangular hysteresis loop core.

It is another feature of this invention that a frequency-dividing circuit include a negative resistance diode connected in series with an inductor having a rectangular hysteresis loop core, and that a constant current source be connected in parallel with the diode.

It is still another feature of the present invention that a frequency-dividing circuit include a monostable-biased negative resistance diode connected in series with an inductor having a rectangular hysteresis loop core, that a constant current source be connected in parallel with the diode, and that an input source supply to the diode-inductor series arrangement signals each of which steps the flux condition of the core toward its maximum positive remanent flux region, only the last signal of each set being effective to actually shift the core to that region and to trigger the diode to undergo a regenerative switching cycle, during which cycle an output signal appears across the diode and a current is caused to flow from the constant current source through the inductor in a direction to reset the core to its maximum remanent flux region.

Figure 3:
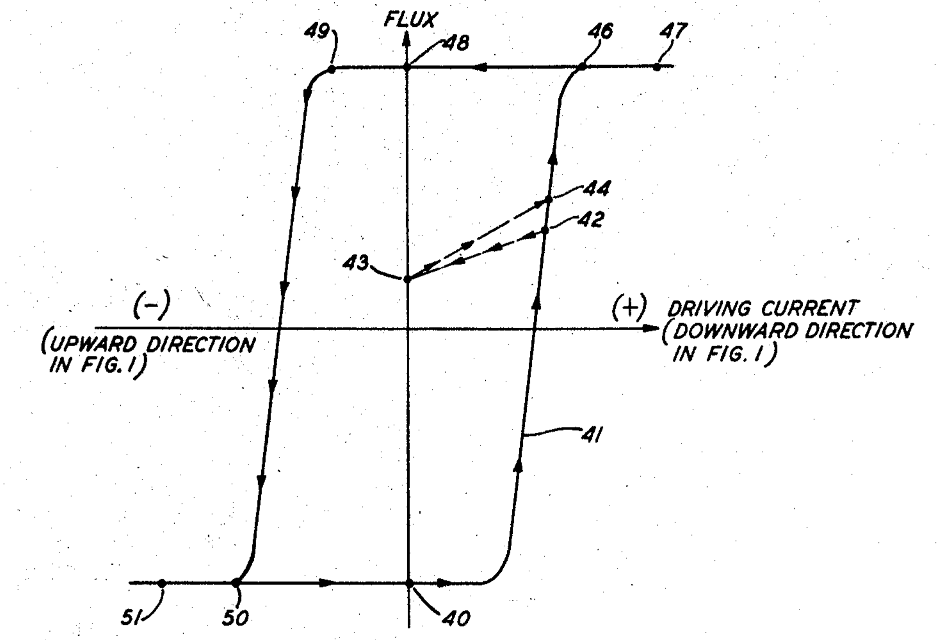
Figure 2:
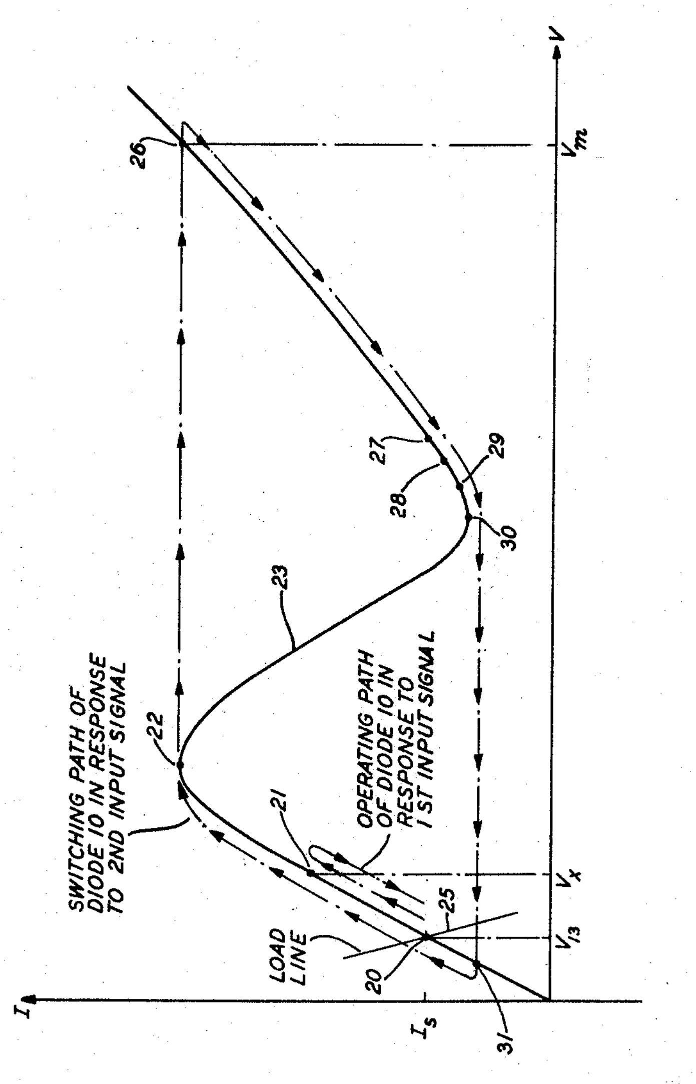

A complete understanding of the present invention and of the above and other features and advantages thereof may be gained from a consideration of the following detailed description of an illustrative embodiment thereof presented hereinbelow in connection with the accompanying drawing, in which:

FIG. 1 is a schematic showing of a specific circuit which illustratively embodies the principles of the present invention;

FIG. 2 depicts the voltage-current characteristic curve of the negative resistance diode included in the illustrative embodiment shown in FIG. 1 and, further, indicates on the curve the switching action that the diode undergoes in response to applied input signals; and FIG. 3 illustrates the hysteresis curve of the core included in the circuit of FIG. 1 and, further, indicates on the curve the manner in which the magnetic condition of the core is selectively controlled by applied input signals.

A great variety of electronic devices and circuits exhibit negative resistance characteristics and it has long been known that such negative resistance characteristics may have one of two forms. The N-type negative resistance, which is referred to as open-circuit stable (or short-circuit unstable, or current-controlled is characterized by zero-resistance turning points. The S-type negative resistance, which is referred to as short-circuit stable (or open-circuit unstable, or voltage-controlled) is the dual of the N-type and is characterized by zero-conductance turning points. The thyratron and dynatron are vacuum tube examples of devices which respectively exhibit N- and S-type negative resistance characteristics.

Illustrative embodiments of the principles of the present invention include negative resistance diodes of the voltage-controlled type, the characteristic curve of such a diode being depicted in FIG. 2. One highly advantageous example of this type of two-terminal negative resistance arrangement is the so-called tunnel diode. Tunnel diodes are described in the literature: see, for example, "New Phenomenon in Narrow Germanium P-N Junctions," L. Esaki, Physical Review, Volume 109, January-March 1958, pages 603–604; "Tunnel Diodes as High-Frequency Devices," H. S. Sommers, Jr., Proceedings of the Institute of Radio Engineers, Volume 47, July 1959, pages 1201–1206; and "High-Frequency Negative-Resistance Circuit Principles for Esaki Diode Applications," M. E. Hines, The Bell System Technical Journal, Volume 39, May 1960, pages 477–513.

The tunnel diode comprises a p-n junction having an electrode connected to each region thereof, and is similar in construction to other semiconductor diodes used for such various purposes as rectification, mixing, and switching. The tunnel diode, however, requires two unique characteristics of its p-n junction; that it be narrow (the chemical transition from n-type to p-type region must be abrupt), of the order of 100 Angstrom units in thickness, and that both regions be degenerate (i.e., contain very large impurity concentrations, of the order of $10^{19}$ per cubic centimeter).

The tunnel diode offers many physical and electrical advantages over other two-terminal negative resistance arrangements. These advantages include: potentially low cost, environmental ruggedness, reliability, low power dissipation, high frequency capability, and low noise properties. Advantageously, then, the negative resistance diodes included in illustrative embodiments of the principles of the present invention are tunnel diodes.

Furthermore, illustrative embodiments of the principles of the present invention include inductors having rectangular hysteresis loop magnetic cores, the hysteresis loop or curve of such a core being illustrated in FIG. 3. This type of core is well known and widely used in the information processing art. Such cores, which are typically toroidal in form and made of a ceramic ferrite material or an ultra-thin ferromagnetic alloy, exhibit high speed switching characteristics and the ability to store binary information reliably and indefinitely without application of power.

Referring now to FIG. 1, there is shown a specific frequency-dividing circuit which illustratively embodies the principles of the present invention. The circuit includes a tunnel diode 10 connected in series with an inductor 11 having a rectangular hysteresis loop magnetic core. Also connected in series with the diode are a resistor 12 and a direct-current bias source 13. Connected in parallel with the diode is a constant current source 15 which includes a direct-current source 16 and a relatively large resistor 17 in series therewith. (In a theoretically perfect constant current source, the series resistor 17 would have an infinitely large value.) The constant current output of the source 15 has the value $I_s$.

Input signals are supplied by a source 14 to the series-connected components 10, 11, 12, and 13 of FIG. 1, and output signals appear across the diode 10, specifically, between lead 18 and ground. More particularly, an output signal appears across the diode 10 in response to the application from the source 14 to the series-connected components 10, 11, 12, and 13 of each set of $n$ input pulses. In the interest of simplicity and clarity of presentation, $n$ will be assumed herein for illustrative purposes to have the value 2.

As indicated by the waveforms shown in FIG. 1, and as will be described in detail hereinbelow, a regenerated output signal appears across the diode 10 in approximate time coincidence with the occurrence of each of the even-numbered input signals. In other words, the frequency or signal repetition rate of the signals appearing between the lead 18 and ground is divided down by a factor of 2 with respect to the frequency of the signals supplied by the source 14.

Under quiescent conditions, i.e., with no signals supplied from the input source 14 to the series-connected components 10, 11, 12, and 13 of FIG. 1, the value of the source 13 is advantageously selected such that the voltage of circuit point 19 with respect to ground is the same as that of the anode of the tunnel diode 10 with respect to ground, which latter voltage is determined by the flow through the diode 10 of current from the source 15. Hence, under quiescent conditions, no current flows through the inductor 11 and the entire constant current output $I_s$ of the source 15 flows downward through the diode 10.

Thus, in FIG. 2, which is a graphical depiction of the relationship between the current through and the voltage across the diode 10 of FIG. 1, there is indicated a quiescent operating point 20 whose corresponding current and voltage values are $I_s$ and $V_{13}$, respectively. $V_{13}$, it is noted, represents the value of the source 13 of FIG. 1.

The point 20 shown in FIG. 2 is defined by the intersection of a load line 25 with the characteristic curve 23. In turn, the slope of the load line 25 is determined by the sum of the values of the resistor 12 and the internal resistance of the input source 14. This sum is selected such that the load line 25 has a slope which is steeper than that of the straight line which approximates the negative resistance portion of the characteristic curve 23. It is noted that the diode 10 is biased for monostable operation, the only stable operating point thereof being the point 20.

Since under quiescent conditions no current flows through the inductor 11, and assuming that the core of the inductor 11 is initially magnetized to its maximum negative remanent flux state, the operating point of the magnetic core is initially represented by point 40 on the hysteresis loop on curve 41 of FIG. 3.

With respect to FIGS. 1 and 3, it is noted that a positive driving current is considered to be one which flows from the circuit point 19 of FIG. 1 downward through the inductor 11, and that a negative driving current is one which flows upward through the inductor 11 to the point 19.

It is well known that the magnetic core of the inductor 11 may be switched from the point 40 in the maximum negative remanent flux region to a point in the maximum positive remanent flux region by applying to the inductor a driving or magnetizing voltage of a prescribed amplitude and duration. However, in accordance with the principles of the present invention, the identical signals supplied by the input source 14 to the series-connected components 10, 11, 12 and 13 of FIG. 1 are selected such that the first input signal causes the magnetic operating point of the core of the inductor 11 to shift from the point 40 to a point 42 whose corresponding flux value is less than that associated with the maximum positive remanent flux condition of the core. Accordingly, the inductor 11 represents a relatively high impedance during the application of the first input signal. As a result, only a relatively small current increment flows through the tunnel diode 10, raising the operating point of the diode 10 from the point 20 (FIG. 2) to a point 21 whose corresponding current value is below that of the peak point 22 of the characteristic curve 23. When the first applied input signal or pulse terminates, the operating point of the diode 10 shifts back to the quiescent point 20. Accordingly, a negligible output signal or pulse having a maximum amplitude $V_x - V_{13}$ appears across the diode 10 in response to the first input pulse.

When the first applied input pulse terminates, the current through the inductor 11 of FIG. 1 returns to a zero value and the magnetic operating point of the core shifts to point 43 of FIG. 3. Then, the application of a second input pulse to the series-connected components 10, 11, 12, and 13 causes the magnetic operating point of the core to follow a path from the point 43 to point 44 and, then, to a point 46 in the maximum positive remanent flux region, during which portion of the second applied pulse the inductor 11 again behaves as a relatively large impedance, which prevents a switching current increment from flowing through the diode 10. However, after the point 46 on the hysteresis curve 41 is reached, no further flux increase can take place in the core of the inductor 11. Thus, during the remainder of the existence of the second applied input pulse, the magnetic operating point of the core simply shuttles from the point 46 to a point 47 and the inductor 11 then behaves as a relatively low impedance, whereby a relatively large current increment then flows through the diode 10 to cause it to be switched over the peak point 22 to a point 26 on the relatively high voltage positive resistance region of the characteristic curve 23.

When the second applied input pulse terminates, the magnetic operating point of the core shifts from the point 47 (FIG. 3) to point 48 and the operating point of the diode 10 shifts to a point 27 (FIG. 2) whose corresponding current value is the same as that corresponding to the quiescent point 20, viz., the current value $I_s$. Subsequently, as the operating point of the tunnel diode 10 shifts from the point 27 to point 28, which requires that the value of current flowing through the diode 10 become less than the constant current output $I_s$ of the source 15, an upward current flows from the constant current source 15 through the inductor 11, thereby causing the magnetic operating point of its core to shift from the point 48 to point 49. Then, as the operating point of the tunnel diode 10 shifts from the point 28 to a lower current point 29, the magnetic operating point of the core shifts from the point 49 to a point 50 in the maximum negative remanent flux region.

Subsequently, the operating point of the tunnel diode 10 shifts from the point 29 past the valley point 30 to a point 31 on the relatively low voltage positive resistance region of the characteristic curve 23. During this time, the operating point of the magnetic core shifts from the point 50 to point 51. Finally, to complete the regenerative switching cycle, the operating point of the diode 10 charges from the point 31 to the quiescent operating point 20 and the operating point of the core shifts from the point 51 back to the quiescent point 40.

Thus, as described in detail above, the frequency-dividing circuit shown in FIG. 1 responds to the second applied input pulse, and in an identical manner to every even-numbered input puse, by causing the tunnel diode 10 to undergo a regenerative switching cycle, which, in turn, causes an output pulse having a precisely determinable time duration and a maximum amplitude $V_m - V_{13}$ to appear across the diode 10 and, furthermore, causes the core of the inductor 11 to be returned to the assumed initial magnetic operating point 40.

In the event that the supply voltages of a system which includes a divider circuit of the type described hereinabove should fail, the state of the circuit is not lost, but remains reliably stored in the core, ready for use at any later time. Accordingly, whenever the supply voltages are restored to the system, the divider circuit resumes its cycle of operation from the point at which it was at the time of the assumed failure. This characteristic is particularly advantageous in very high speed computing systems, in which the necessity to recycle a circuit following a supply voltage failure might be untolerable from a time standpoint.

It is emphasized that although particular attention herein has been directed to a specific circuit which divides by a factor of 2, it is to be understood that circuits which divide by other integral factors may be easily implemented in the light of the principles set forth hereinabove. Thus, for example, if a dividing factor or $n$ of 4 should be desired, the characteristics of the input pulses are selected with respect to the hysteresis characteristic of the core such that only every fourth input pulse actually drives the core into its maximum positive remanent flux region. In that way, every fourth input pulse triggers the tunnel diode 10 to undergo a regenerative switching cycle and to provide thereacross an output pulse.

Moreover, although particular attention herein has been directed to the use of a tunnel diode as the component 10 of the circuit of FIG. 1, it is emphasized that other two-terminal voltage-controlled negative resistance arrangements having characteristics of the type shown in FIG. 2 may also be used therefor.

Additionally, it is to be understood that the above-described arrangements are only illustrative of the application of the principles of the present invention. Numerous other arrangements may be devised by those skilled in the art without departing from the spirit and scope of the invention.

What is claimed is:

1. In combination in a frequency-dividing circuit, an inductor having a core exhibiting a rectangular hysteresis loop characteristic which includes maximum negative and positive remanent flux regions, a tunnel diode connected in series with said inductor, means for biasing said diode for monostable operation, means connected in series with said inductor-diode series arrangement for supplying thereto sets of pulses which step the flux condition of said core toward said maximum positive remanent flux region, only the last one of each set of pulses being effective to actually shift said core to its maximum positive remanent flux region and to trigger said diode to undergo a regenerative switching cycle, and constant current source means connected in parallel with said diode and responsive to said diode undergoing a regenerative switching cycle for causing a current flow through said inductor in a direction to reset said core to its maximum negative remanent flux region.

2. In combination in a frequency-dividing circuit, regenerative switching means including an inductor and a tunnel diode connected in series therewith, a rectangular hysteresis loop magnetic core associated with said inductor, input source means connected in series with said inductor and said diode for supplying signals each set of $n$ of which drives said core from its maximum negative remanent flux condition to its maximum positive remanent flux condition and thereby triggers said regenerative means to undergo a regenerative switching cycle and to provide an output signal across said diode, and a constant current source connected in parallel with said diode for driving said core from its maximum positive remanent flux condition to its maximum negative remanent flux condition during said regenerative switching cycle.

References Cited in the file of this patent

UNITED STATES PATENTS

| | | |
|---|---|---|
| 2,897,380 | Neitzert | July 28, 1959 |
| 3,070,708 | Dill | Dec. 24, 1962 |
| 3,076,944 | Watters | Feb. 5, 1963 |
| 3,094,631 | Davis | June 18, 1963 |